United States Patent Office 3,055,878
Patented Sept. 25, 1962

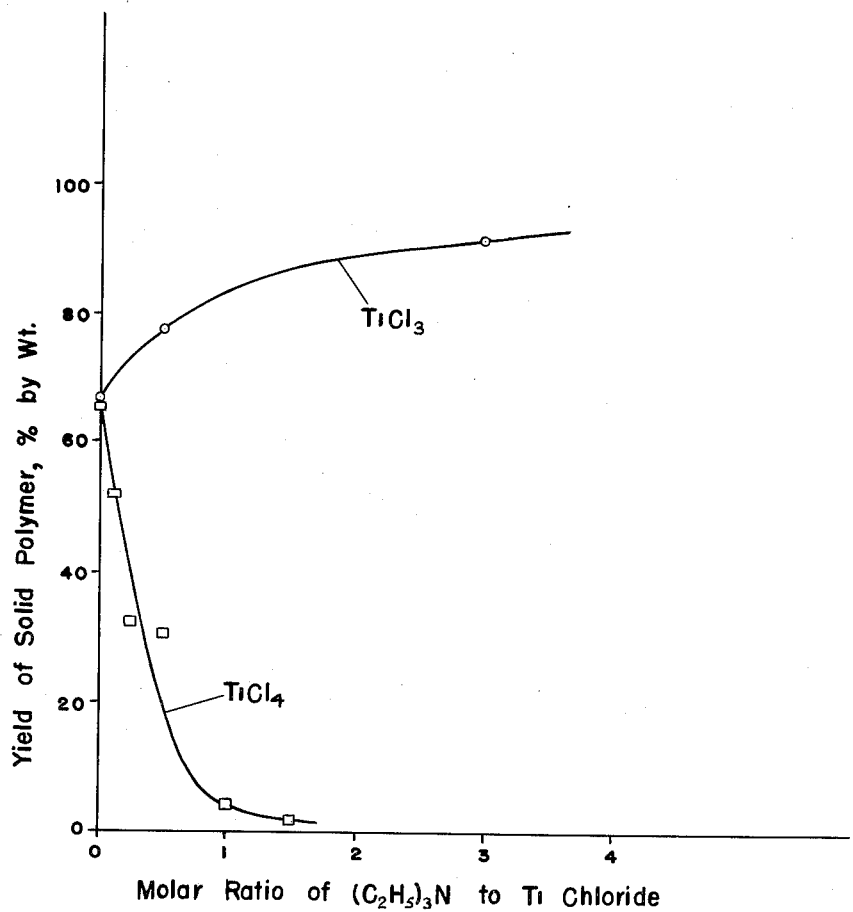

3,055,878
POLYMERIZATION OF OLEFINS
Edward J. Janoski, Philadelphia, Pa., assignor to Sun Oil Company, Philadelphia, Pa., a corporation of New Jersey
Filed June 18, 1959, Ser. No. 821,176
7 Claims. (Cl. 260—93.7)

This invention relates to an improved catalytic system for the polymerization of alpha-olefins and to the method of polymerizing alpha-olefins to solid polymers by means of such catalytic system.

It is known that olefin hydrocarbons, such as ethylene, propylene or higher molecular weight alpha-olefins, can be polymerized by means of certain metal halides in combination with a catalyst activator. A particular effective catalyst system for producing solid polymers comprises a titanium halide in which the metal is in a valence state other than its highest valence state, e.g. $TiCl_3$, in combination with an aluminum alkyl activator, e.g. aluminum triethyl. These materials are used in an inert liquid hydrocarbon medium, such as hexane or octane, with the catalyst particles being dispersed therein, and the charge olefin is contacted with the dispersion to effect polymerization. Solid polymers having a high degree of crystallinity and which are suitable for preparing films, fibers and numerous other articles can be prepared in this manner.

One well known way of producing a catalyst system of the foregoing type involves dissolving $TiCl_4$ in an inert liquid hydrocarbon medium and adding a reducing agent such as aluminum triethyl. This causes the titanium to be reduced to a lower valence state, thereby forming solid catalyst particles which are dispersed in the hydrocarbon medium. The aluminum triethyl in the system functions as a reducing agent and catalyst activator.

The present invention provides an improved catalytic polymerization system which is capable of promoting the polymerization of alpha-olefins at a substantially faster rate than is obtained with the catalyst systems heretofore used. According to the invention a preformed titanium trihalide, such as $TiCl_3$, is dispersed in an inert liquid hydrocarbon medium and a tertiary amine is added thereto. Thereafter, and preferably after the mixture containing the $TiCl_3$ and tertiary amine has been allowed to age for a substantial time, an aluminum trialkyl, such as aluminum triethyl, is added. It has now been found that the presence of the tertiary amine in the mixture, when it has been added prior to the addition of the aluminum trialkyl, causes a substantial increase in the rate of polymerization when the system is contacted with an alpha-olefin.

The invention can be utilized for preparing solid polymers from any alpha-olefin having 2–10 carbon atoms per molecule which does not have a side chain substituent adjacent the double bond; in other words, any such substituent should not be closer to the bond than the 3-position. Examples of olefins which can be employed are ethylene, propylene, butene-1, 3-methylbutene-1, 3,3-dimethylbutene-1, 4-methylpentene-1, 3-methylpentene-1, 3,4-dimethylpentene-1, 4,4-diethylpentene-1, hexene-1, 3,5-dimethylhexene-1, heptene-1, 3,5,6-trimethylheptene-1, octene-1, decene-1, 1,3-butadiene, 1,4-pentadiene and styrene. The present catalyst system can also be employed to prepare copolymers of such olefins.

In preparing solid polymers according to the invention, it is essential that the amine employed in forming the catalyst system be a tertiary amine. Primary and secondary amines not only will not give an improved catalyst system but in fact have an adverse effect. The amine should conform to the generic formula

wherein $R_1$, $R_2$ and $R_3$ each are hydrocarbon radicals having 1–8 carbon atoms including alkyl, cycloalkyl and aryl radicals and wherein not more than one of the R groups is a methyl group. Examples of suitable amines are methyl diethylamine, triethylamine, tripropylamine, methyl dipropylamine, ethyl dipropylamine, triisobutylamine, methyl diamylamine, trihexylamine, trioctylamine, methyl diphenylamine, ethyl diphenylamine, triphenylamine, tribenzylamine, tricyclohexylamine and the like. Mixtures of such amines can also be utilized. Amines which have more than one methyl group, e.g. trimethylamine, have an adverse effect and are not employed in practicing the present invention.

It is also important in practicing the invention that the titanium halide used be a preformed trihalide, preferably $TiCl_3$, although its fluorine, bromine or iodine analogues can also be employed with good results. The prior art procedure referred to above wherein the catalyst system is prepared by starting with $TiCl_4$ and adding a reducing agent such as aluminum triethyl is not applicable for the present invention. It has been found that when $TiCl_4$ is used, a tertiary amine is then added and aluminum triethyl is thereafter admixed into the system, a sharp reduction in catalytic activity is experienced as compared to using $TiCl_4$ and aluminum triethyl without any amine. In contrast, when preformed $TiCl_3$ is utilized and the tertiary amine and aluminum triethyl are added in the order named, a substantial rise in catalytic activity results as compared to using $TiCl_3$ and aluminum triethyl without the amine.

A comparison of results obtained with preformed $TiCl_3$ and with $TiCl_4$ is shown in the accompanying drawing which presents curves showing the effect of adding triethylamine to each type of system. In each of the runs represented by the points shown in the drawing, the titanium halide was added to n-heptane in amount of 0.15 mole per liter of n-heptane, triethylamine was added (except in the two control runs wherein none was used), 4-methylpentene-1 was then added in amount to provide a concentration of about 58 mole percent in the mixture, and thereafter aluminum triethyl was introduced in a molar ratio to the titanium halide of 3:1. The mixture was then heated to 60° C. and maintained at such temperature for 30 minutes. After this reaction period, the catalyst was deactivated by adding methanol and the solid polymer was separated, dried and weighed.

The drawing shows the effect of varying the ratio of triethylamine to the titanium salt on catalytic activity, the latter being measured in terms of the weight percent, based on the 4-methylpentene-1 used, of solid polymer produced during the 30 minute reaction period. It can be seen that without any amine both the $TiCl_3$ and $TiCl_4$ gave systems having about the same activity (66–67% yield). When triethylamine was used with $TiCl_3$, activity increased, as shown by the upper curve, as the ratio of the triethylamine to $TiCl_3$ was increased. On the other hand, the activity dropped sharply, as shown by the lower curve, for the $TiCl_4$ system as the ratio of triethylamine to $TiCl_4$ was increased. As indicated by the upper curve, the use of the tertiary amine in a molar ratio to the $TiCl_3$ of 0.5:1 effects a substantial increase in catalytic activity (from 67% to 78%) and higher ratios are still more beneficial. As a general rule, ratios larger than 5:1 cause little, if any, further improvement in the catalytic activity although higher ratios, e.g. 10:1, can be employed if desired.

The reaction medium for forming the present catalyst system can be any organic liquid which is inert under the reaction conditions employed and preferably is an inert hydrocarbon or mixture of hydrocarbons, for example, hexanes, heptanes, octanes, cyclopentanes, cyclohexanes, benzene, toluene, xylenes, decalin and the like. Nonterminal olefins which will not react under the conditions employed during the reaction can also be used. The aluminum alkyl activator can be any aluminum alkyl wherein the alkyl groups each have 1–10 carbon atoms. The compound preferred is aluminum triethyl; however, trialkyls such as trimethyl, triisobutyl, triisooctyl and tridecyl compounds of aluminum can be used with good results. The amount of $TiCl_3$ that should be employed generally should be in the range of 0.2–60 g. per liter of the inert liquid reaction medium and the molar ratio of the aluminum activator to the titanium trihalide generally should be in the range of 0.2 to 20 and more preferably 1.0 to 5.0.

Temperatures at which the polymerization reactions are carried out in the present process generally are in the range of 50–250° F. and more preferably 70–190° F. With a monomer which is readily polymerizable such as ethylene, a relatively low reaction temperature, e.g. normal room temperature, can be employed; whereas with a less easily polymerizable monomer, such as propylene, it is desirable to use a higher temperature, e.g. 160–175° F., in order to increase the reaction rate. The pressure in the reactor will depend upon the particular monomer being polymerized and the reaction temperature selected, and it generally will vary from atmospheric pressure to 500 p.s.i.g. or higher.

After the polymerization reaction has been carried out, the catalyst system should be deactivated by adding an alcohol, such as methanol, and intimately mixing it with the hot reaction mixture. Preferably, an acid, such as hydrochloric acid or oxalic acid, is included in the alcohol to aid in removing metals from the polymer. After separating the solid polymer as by filtration, it may be desirable to intimately admix it one or more times with fresh acidic methanol to secure a maximum removal of metal components. The polymer then can be washed with water and dried. The resulting product can, if desired, be compounded with a minor amount of one or more inhibitors to prevent oxidation or degradation, and the composition can then be extruded or molded to produce films, fibers or other articles.

In preparing the present catalyst system it has been found that enhanced catalytic activity can be obtained by allowing the mixture of titanium trihalide and tertiary amine in the inert liquid medium to age for a time before the aluminum trialkyl is added. Preferably the mixture is aged for at least one hour and may be aged for a time of 24 hours or longer if desired. It has been found in some instances that an increase in polymerization rate as much as four-fold, as compared with the rate obtained when the tertiary amine is omitted, can be obtained. This is highly advantageous, since it allows a much higher rate of polymer production for a given reactor size.

The following examples serve to illustrate the invention more specifically:

Example I

Preformed $TiCl_3$ was dispersed in isooctane in a concentration of 39 g. (0.25 mole) per liter and triethylamine was added in a molar ratio to the $TiCl_3$ of 3:1. The mixture was allowed to age for 16 hours at a temperature of 28° C. The olefin monomer, 4-methylpentene-1, was added in amount such that its molar concentration in the mixture was about 54%. Aluminum triethyl was then added, the mixture was heated to 60° C. and reacted at that temperature while being stirred for a time of 30 minutes. Upon recovery of the solid polymer product, it was found that the average rate of its production was about 18 g. per liter per minute.

By way of comparison, when the same conditions were used except that the triethylamine was omitted, the average rate of solid polymer production was found to be about 4.8 g. per liter per minute. Thus, the use of the triethylamine, aged with the TiCl3 for 16 hours prior to the addition of aluminum triethyl, caused an acceleration in polymerization rate of almost four-fold.

Example II

Comparative runs were made under conditions similar to those set forth in Example I to determine the effect on polymerization rate of the time of aging at 28° C. the dispersion of $TiCl_3$ and triethylamine before the addition of the aluminum triethyl. The following results were obtained:

| | Time of aging, hrs. | Rate, g./liter/min. |
|---|---|---|
| Without amine | | 4.8 |
| With amine | 0 | 6 |
| Do | 1 | 8 |
| Do | 2½ | 10 |
| Do | 16 | 18 |
| Do | 24 | 18 |

These results show that the length of aging of the $TiCl_3$-triethylamine mixture before the addition of the aluminum alkyl is an important factor in securing maximum increase in polymerization rate. Without any aging the presence of the amine causes an improvement which is significant, but aging for at least one hour and preferably longer effects a marked increase in polymerization rate. The data indicate that little if any further improvement is obtained by aging beyond 16 hours.

Example III

Three comparative runs were made with 4-methylpentene-1 under conditions similar to those described in Example I except that trimethylamine was used in place of triethylamine. The dispersion of $TiCl_3$ and trimethylamine was aged at 28° C. for 16 hours prior to the addition of the aluminum triethyl. The effect on polymerization rate of the proportion of trimethylamine employed is shown by the following data.

| Molar ratio of $(CH_3)_3N$ to $TiCl_3$: | Polymerization rate, g./liter/min. |
|---|---|
| 0 | 4.8 |
| 3 | 2.9 |
| 12 | 0.0 |

These results show that trimethylamine had an adverse effect and cannot be used for practicing the present invention.

Example IV

Preformed $TiCl_3$ was dispersed in n-heptane in a concentration of 4 g. (0.026 mole) per liter and triethylamine was added in a molar ratio to the $TiCl_3$ of 5.5:1. The starting olefin, 4-methylpentene-1, was then introduced to a molar concentration of about 58%. Without any substantial aging period, aluminum triethyl was added in a molar proportion to the $TiCl_3$ of 16. The mixture was reacted at 60° C. while being stirred for 30 minutes. It was found that the average rate of solid polymer formation was 0.82 g. per liter per minute.

In comparison, when the triethylamine was omitted with the conditions otherwise being the same, the rate of solid polymer formation was 0.55 g. per liter per minute. Thus, under the present conditions, the presence of the amine increased the polymerization rate by a factor of about 1.5.

Example V

A 33 g. dispersion of white mineral oil and $TiCl_3$ at a 25 weight percent concentration therein was admixed with 16.2 g. of triethylamine and 16 cc. of isooctane alkylate, and the mixture was aged by stirring for 16 hours at room temperature. It was then added to a mixture comprising about 3300 cc. of alkylate and 18.3 g. of aluminum triethyl in a pressure reactor. The mixture was heated to 160° F. and 590 cc. of propylene (liquid basis) was introduced into the system. This was equivalent to a propylene concentration of about 26 mole percent based on the alkylate. Over a reaction period of 33 minutes and while stirring the mixture at a temperature of 160° F., additional propylene in amount of 390 cc. (liquid basis) was added. At the end of the 33 minute period, methanol was added to the reactor to de-activate the catalyst. Thereafter, the reaction mixture was filtered, and the solid polymer was repulped with methanol and again separated by filtration. The resulting wet cake was extracted with pentane to remove methanol and pentane-soluble polymers and was then dried. The amount of pentane-soluble polymer was determined by evaporating the solvent from the filtrate. The amount of heptane-insoluble polymer in the pentane-insoluble product also was determined by extracting a sample thereof with heptane in a Soxhlet extractor.

For comparison purposes a control run was made under substantially similar conditions except that no triethylamine was used in the catalytic system. Comparative data for the two runs were as follows:

|  | With Amine | Without Amine |
|---|---|---|
| Percent Pentane-soluble product | 9 | 24 |
| Pentane-Insoluble Product: |  |  |
| production rate, lbs./gal./hr | 1.00 | 0.49 |
| percent hepatane-insoluble | 95 | 94 |
| yield strength, p.s.i. @ 1 in./min | 4,100 | 4,125 |
| breaking strength, p.s.i. @ 1 in./min | 5,100 | 5,915 |
| Izod impact strength, ft. lbs./in | 0.4 | 0.4 |
| brittle point, ° F | 65 | 67 |
| percent elongation at break | 600 | 755 |
| melt index [1] | 0.06 | 0.18 |
| heat distortion, ° F | 127 | 122 |

[1] Modified A.S.T.M. Method D-1238-57T, using a temperature of 230° C. and a load of 2160 g.

These results show that the pentane-insoluble polymer products obtained with the two catalyst systems are largely comparable in properties. They also show, however, that the use of a tertiary amine in the manner of the present invention provides two distinct advantages: (1) it considerably reduces the amount of undesirable pentane-soluble product obtained and (2) it markedly increases the rate of polymerization.

Substantially similar improvements are secured, in practicing the present invention, when other alpha-olefins as hereinbefore specified are polymerized and when other tertiary amines within the group specified above are substituted for triethylamine.

I claim:

1. A catalyst system suitable for polymerizing an alpha-olefin having 2–10 carbon atoms per molecule, and having no branching adjacent the double bond, which consists essentially of a dispersion in an inert hydrocarbon medium of solid particles formed by contacting in said medium a preformed titanium trihalide with a tertiary amine for a period of at least one hour, at a mol ratio of amine to titanium trihalide in the range of 0.5 to 10, and thereafter adding an aluminum alkyl in which each alkyl group has 1–10 carbon atoms, in a mol ratio of aluminum alkyl to titanium trihalide of from 1:1 to 5:1, said amine having the formula

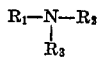

wherein $R_1$, $R_2$, and $R_3$ are each hydrocarbon radicals having 1–8 carbon atoms and selected from the group consisting of alkyl, cycloalkyl, and aryl radicals and wherein not more than one R is a methyl group.

2. A catalyst system according to claim 1 wherein said amine is triethylamine and said trihalide is $TiCl_3$.

3. Method of polymerizing an alpha-olefin having 2–10 carbon atoms per molecule and having no branching adjacent the double bond which comprises contacting such olefin, at a temperature of from 50° F. to 250° F. with a catalytic system comprising an inert liquid hydrocarbon medium and a catalytic material prepared by contacting, in said medium, a preformed titanium trihalide with a tertiary amine for a period of at least one hour, at a mol ratio of amine to titanium trihalide in the range of 0.5 to 10, and thereafter adding an aluminum alkyl in which each alkyl group has from 1 to 10 carbon atoms, in a mol ratio of aluminum alkyl to titanium trihalide of from 1:1 to 5:1, said amine having the formula

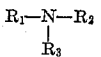

wherein $R_1$, $R_2$, and $R_3$ are each hydrocarbon radicals having 1–8 carbon atoms and selected from the group consisting of alkyl, cycloalkyl, and aryl radicals and wherein not more than one R is a methyl group.

4. Method according to claim 1 wherein said alpha-olefin is polypropylene and the titanium trihalide is $TiCl_3$.

5. Method according to claim 4 wherein the tertiary amine is triethylamine.

6. Method according to claim 1 wherein said alpha-olefin is 4-methylpentene-1 and the titanium trihalide is $TiCl_3$.

7. Method according to claim 6 wherein the tertiary amine is triethylamine.

References Cited in the file of this patent

UNITED STATES PATENTS

| 2,529,315 | Serniuk | Nov. 7, 1950 |
| 2,839,518 | Brebner | June 17, 1958 |
| 2,886,561 | Reynolds et al. | May 12, 1959 |
| 2,899,416 | Schreyer | Aug. 11, 1959 |
| 2,905,645 | Anderson | Sept. 22, 1959 |
| 2,910,461 | Nowlin | Oct. 27, 1959 |

FOREIGN PATENTS

| 554,242 | Belgium | May 16, 1957 |
| 776,326 | Great Britain | June 5, 1957 |
| 777,538 | Great Britain | June 26, 1957 |
| 797,344 | Great Britain | July 2, 1958 |

OTHER REFERENCES

Belgian, 573,872, Derwent Belgian Patent Report No. 52A, page A–25, March 31, 1959.

Kresser: Polyethylene, Reinhold (New York, 1957), page 9.